E. M. & A. G. RAYBURN.
TRANSMISSION.
APPLICATION FILED NOV. 22, 1916.
1,297,733.
Patented Mar. 18, 1919.
6 SHEETS—SHEET 6.
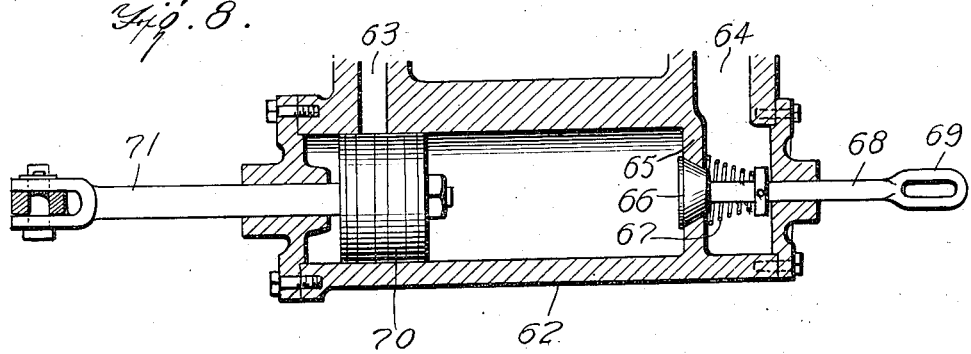
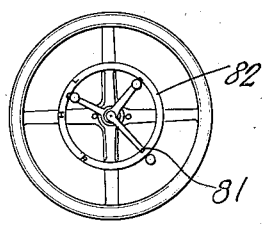
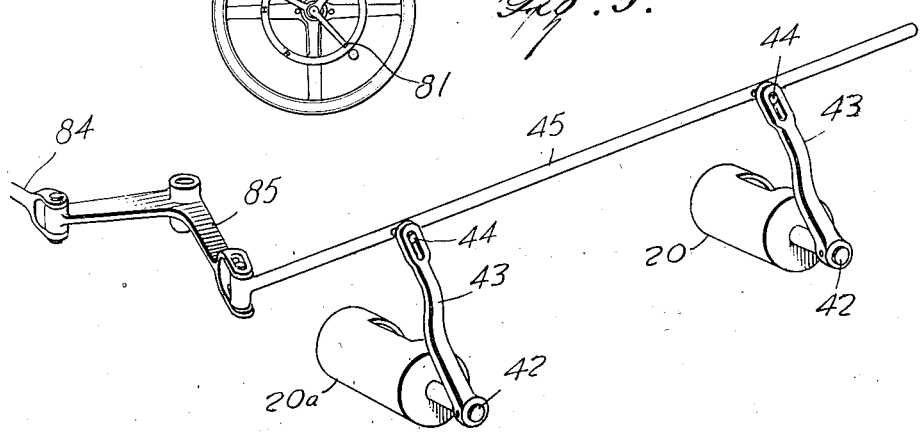
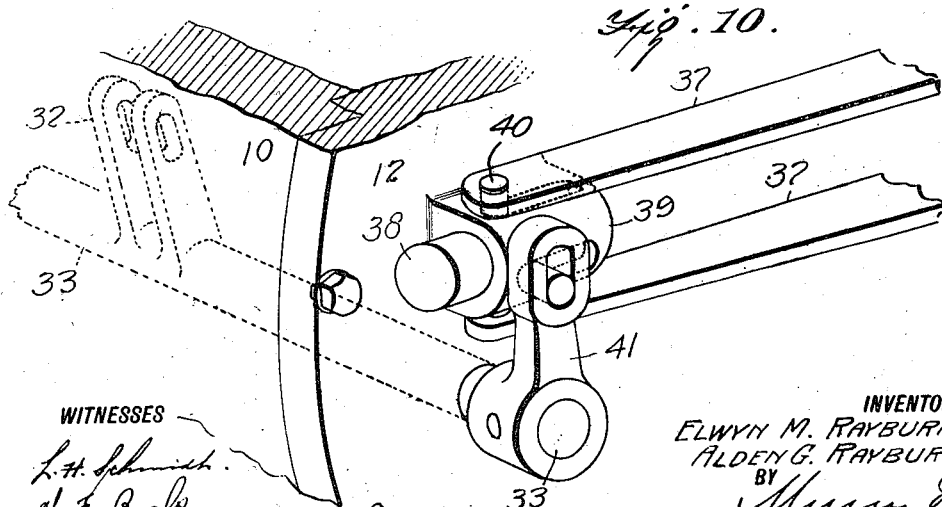
WITNESSES
INVENTORS
ELWYN M. RAYBURN,
ALDEN G. RAYBURN,
BY
ATTORNEYS

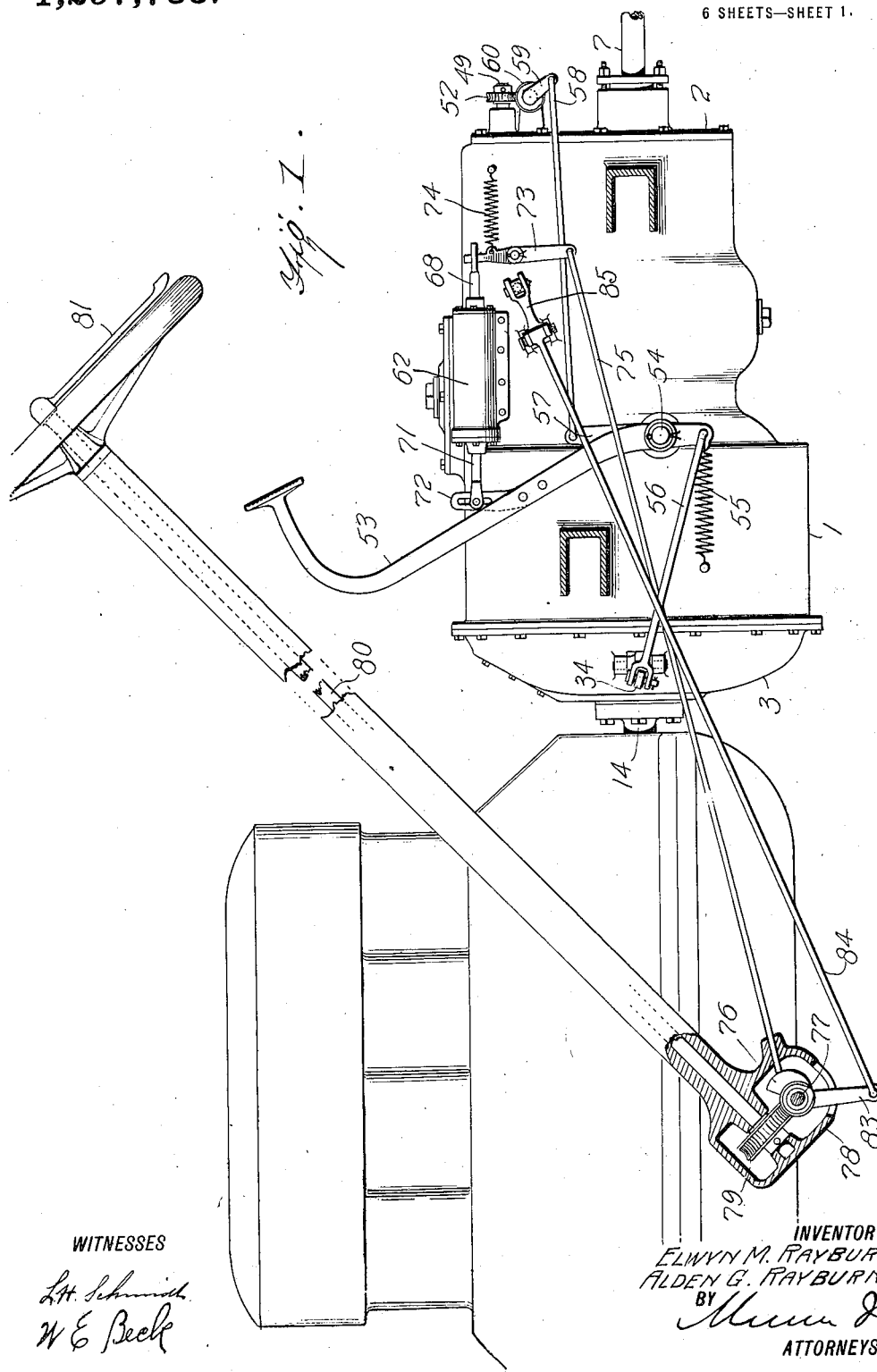

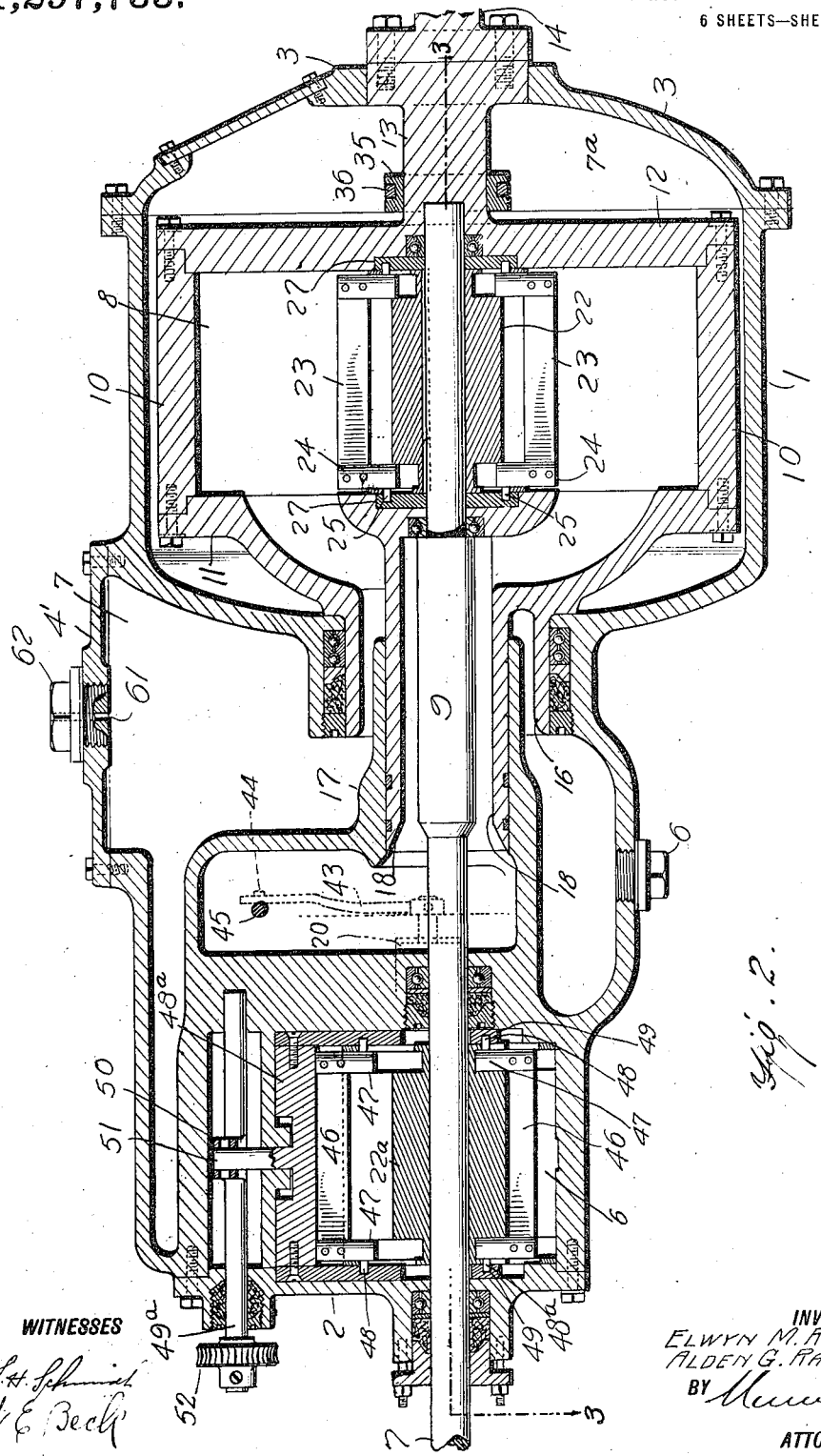

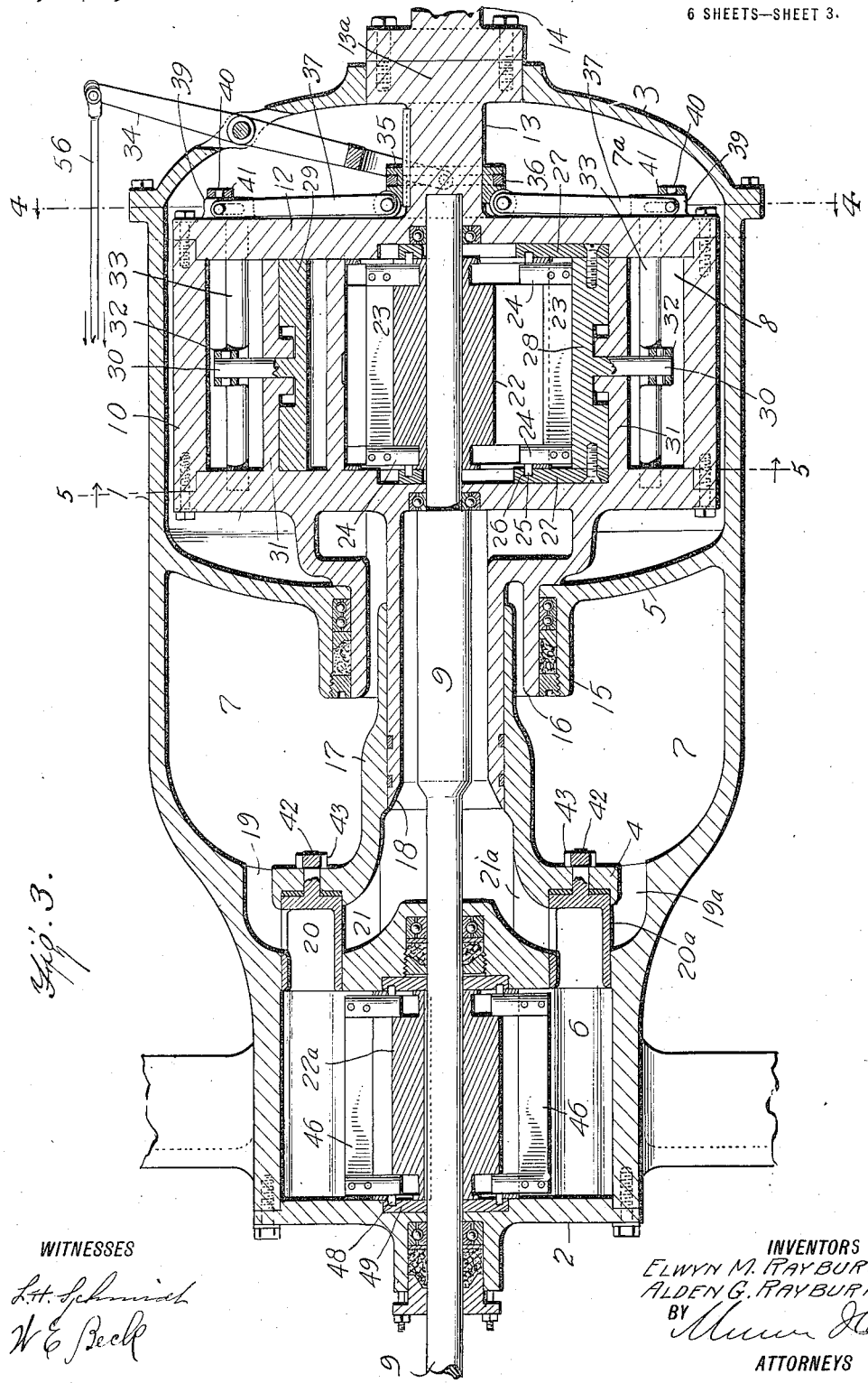

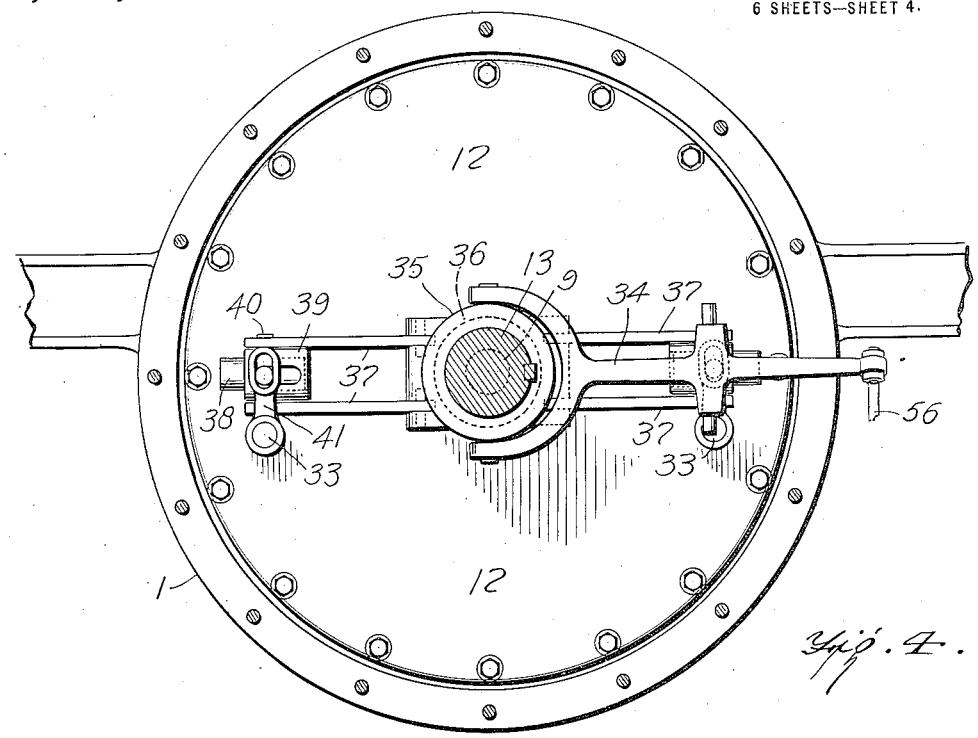
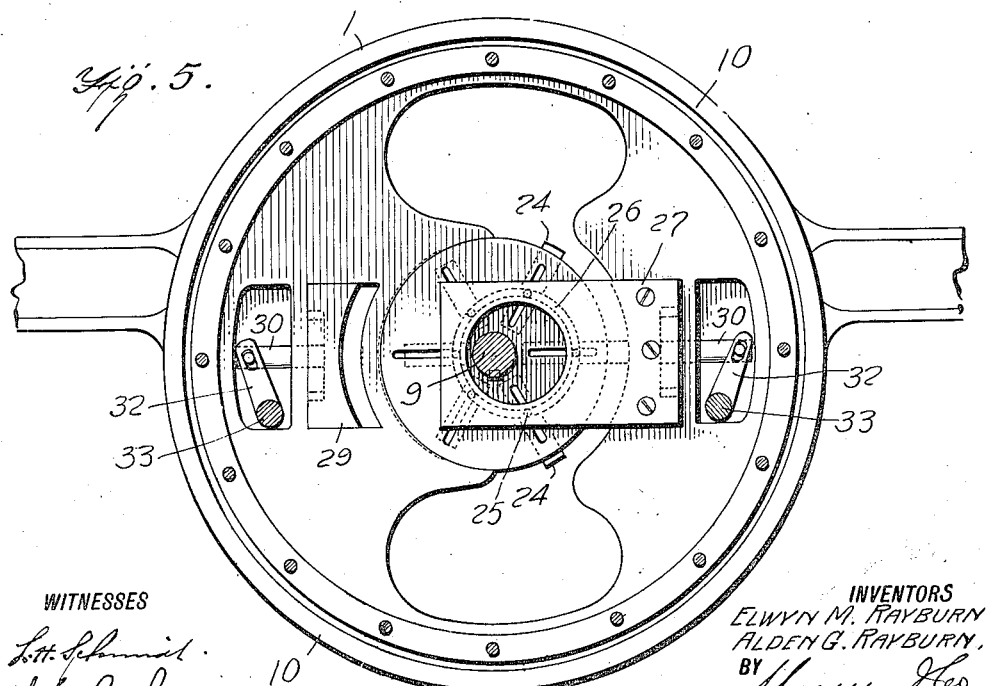

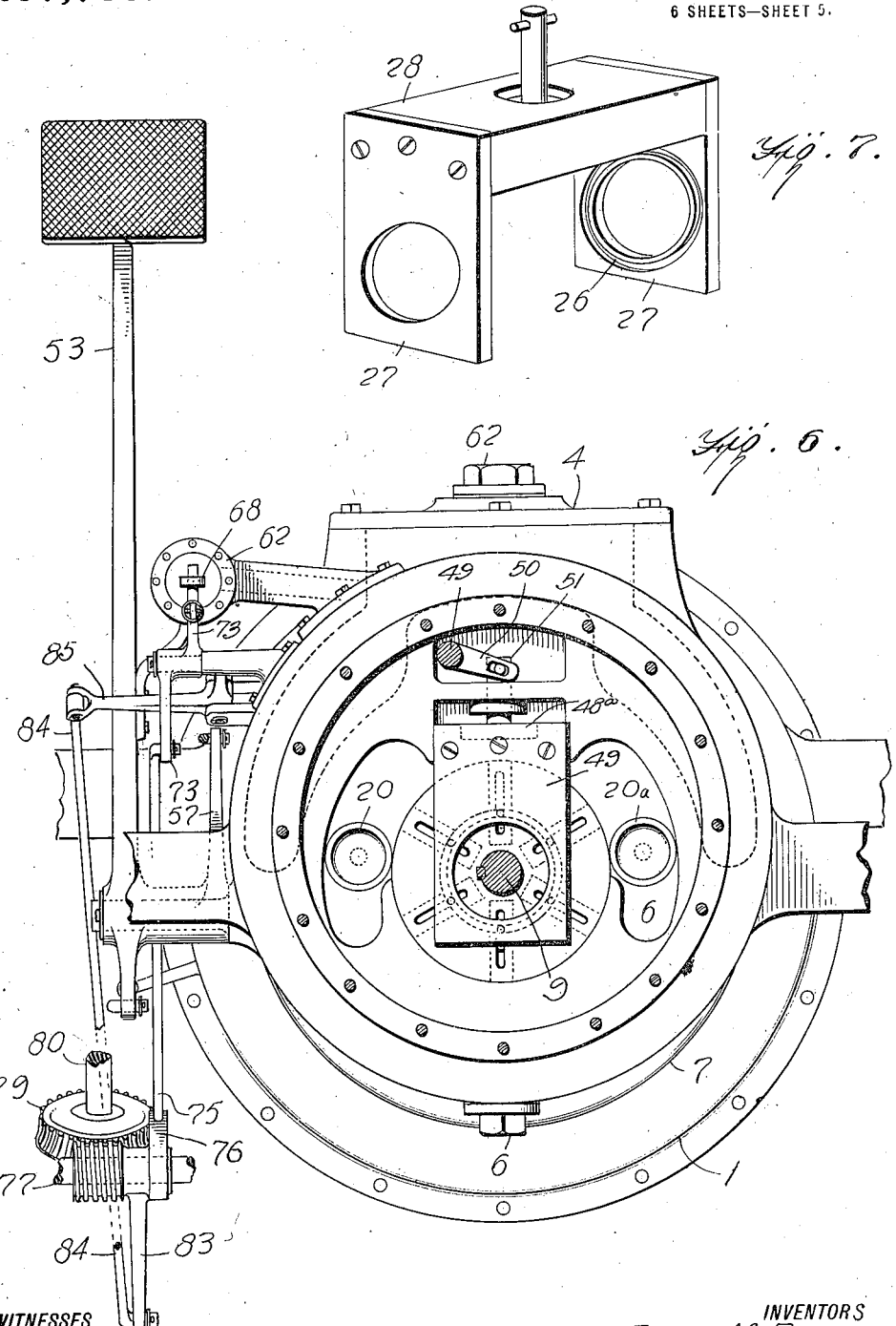

UNITED STATES PATENT OFFICE.

ELWYN METTE RAYBURN AND ALDEN GRANVILLE RAYBURN, OF SAUSALITO, CALIFORNIA.

TRANSMISSION.

1,297,733.  Specification of Letters Patent.  Patented Mar. 18, 1919.

Application filed November 22, 1916. Serial No. 132,882.

*To all whom it may concern:*

Be it known that we, ELWYN METTE RAYBURN and ALDEN GRANVILLE RAYBURN, citizens of the United States, and residents of Sausalito, in the county of Marin and State of California, have invented an improvement in Transmissions, of which the following is a specification.

Our invention is an improvement in transmission mechanism, and has for its object to provide a transmission especially adapted for motor vehicles, wherein the driving and driven shafts are connected by a fluid controlled mechanism, permitting them to be connected at any desired speed, wherein means is provided in connection with the transmission for converting into useful work that portion of the power of the motor which is usually wasted, when the driving and driven shafts are not directly connected.

In the drawings:

Figure 1 is a side elevation of the improved transmission.

Fig. 2 is a longitudinal vertical section.

Fig. 3 is a section on the line 3—3 of Fig. 2.

Figs. 4 and 5 are sections on the lines 4—4 and 5—5, respectively, of Fig. 3, each view looking in the direction of the arrows adjacent to the line.

Fig. 6 is an end view with the cover plate removed.

Fig. 7 is a perspective view of the cam plates and their connections.

Fig. 8 is a sectional view through the holding valve.

Fig. 9 is a perspective view of the reversing valves and their connections.

Fig. 10 is a perspective view of the blade operating mechanism.

Fig. 11 is a plan view of the steering wheel and the controlling lever.

In the present embodiment of the invention a casing 1 is provided, which has its ends closed by heads 2 and 3 and is divided by partitions 4 and 5 into three compartments, the said compartments being designated by the numerals 6, 7 and 7ª, respectively.

A shaft 9 is journaled longitudinally of the casing, and a species of fly wheel is journaled on the shaft at the end adjacent to the head 3, the said fly wheel comprising a ring 10 and heads 11 and 12 secured to the ends of the ring. The head 12 of the fly wheel has an axial extension 13, which is secured to the driving shaft 14, the said extension having an enlargement 13ª journaled in the central opening in the head 3. Thus when the driving shaft is rotated the fly wheel will be rotated therewith. The interior of the fly wheel forms a chamber 8, which is connected with the chambers 6 and 7 in a manner to be described. The partition 5 has an extension hub or bearing 15, in which is journaled a similar extension 16 from the head 11, and the partition 4 has a bearing hub or extension 17 in which is journaled a similar hub or extension 18 from the head 11. There is an annular space between the extensions 16 and 17, which forms a passage leading from the chamber 7 to the chamber 8 for the liquid which is adapted to be held in the chamber 7, and through this passage the said liquid may pass freely into the chamber 8. Ports 19 and 19ª lead from the chamber 7 to the chamber 6, and each port is controlled by a rotary valve 20 and 20ª, respectively, the said valves being arranged transversely of the ports for permitting either to be opened or closed.

Other ports or passages 21 and 21ª connect the chamber 6 to the chamber 8, passing through the extensions or hubs 17 and 18, and the valves 20 and 20ª are arranged in such manner that they may connect the chamber 7 with the chamber 6 by way of the port 19, and the chamber 6 with the chamber 8 by way of the port 21ª, or they may connect the chamber 7 with the chamber 6 by way of the port 19ª and the chamber 6 with the chamber 8 by way of the port 21.

The shaft 9 is journaled in ball bearings in the head 2, the partitions 4 and 5, and in the heads 11 and 12, and other ball bearings are arranged between the extension hubs 15 and 16, and suitable packings are provided in connection with the bearings.

A rotor is secured to the shaft within the fly wheel, and a second rotor is secured to the shaft within the chamber 6. The rotor within the fly wheel comprises a hub 22 which is provided with radial slots in which are arranged blades or vanes 23, each blade being provided at each end with a guide 24 which moves in a radial opening at the adjacent end of the rotor. Each guide 24 is provided with an outwardly extending pin 25, which engages an annular groove 26 in a cam plate 27 arranged at the adjacent end of the fly wheel in a recess in the adjacent head. These cam plates are connected by an abutment 28, and when the abutment is moved toward or from the periphery of the rotor, the cam plates 27 will be moved therewith, to control the protrusion and contraction of the blades with respect to the rotor. A counterweight 29 is provided at the opposite side of the fly wheel from the abutment, for counterbalancing the abutment, and the said counter-weight is arranged to be moved in synchronism with the abutment so that the fly wheel will not be thrown out of balance by the movement of the abutment. Both counterbalance and abutment have radial stems 30, which extend through guide webs 31 in the fly wheel and integral with the head 11 to a connection with radial arms 32 on shafts 33 which are journaled in the fly wheel parallel with the shaft 9. The connection between these stems 30 and the arms 32 is a lost motion connection, as shown, so that when the shafts are oscillated the stems will be moved toward and from the rotor.

The shafts 33 are simultaneously oscillated by means of a lever 34, which is pivoted intermediate its ends in an opening in the head 3. The inner end of the lever is connected with the collar 35, which is keyed to the axial extension 13 of the fly wheel to slide thereon and to turn therewith, by means of a ring 36, which is arranged within an annular groove in the collar, and is connected to the arms of a fork on the inner end of the lever. Oppositely arranged pairs of links 37 are pivoted at their inner ends to the collar and at their outer ends to a block 38, which is mounted to slide in a bearing 39 on the head 12. This plug has oppositely extending pins 40, which pass through slots in the opposite side of the guide and engage openings in the links, and a radial arm 41 on the adjacent shaft 33 is connected with the adjacent plug by a lost motion connection, as shown, the plug having a pin extending through a slot in the bearing which engages a loop in the end of the arm. It will be evident from the description that when the collar 35 is moved outwardly, the plugs 38 will be drawn inwardly and the shafts 33 will be oscillated in a direction to move the counter-weight and the abutment toward the rotor, while when the collar is moved in the opposite direction the abutment and the counter-weight will be drawn away from the rotor.

It will be understood that the blades 23 and 46 move in opposite directions, that is, when the blades 23 are extended the blades 46 are contracted.

In starting the device, the engine is started and the fly wheel portion of the clutch, that is, the elements 10, 11 and 12, rotate idly about the shaft 9. There is no tendency to move the oil, that is, there is no pumping action of the rotor, because the blades 23 are concentric or within the rotor. The blades 23 are now partly extended, as, for instance, one-eighth of the total blade area being projected outside of the rotor. This movement moves the blades 46 inwardly one-eighth of the total blade area, leaving seven-eighths of said area projecting. A slight pumping action now takes place, that is, a movement of the oil from the chamber 7 through the chamber 8, the hub extension 18, the port 21$^a$ and the valve 20$^a$ to the chamber 6, and the oil returns from the chamber 6 to the chamber 7 by way of the valve 20 to the port 19. This moving oil strikes the blades 46 which are seven-eighths extended, thus tending to rotate the boosting unit and the shaft 9, and the pressure of the moving oil continues as the blades 23 are further extended, until there is sufficient pressure to turn the unit and the shaft 9. The extension of the blades 23 will tend to cause the clutch unit to move with the fly wheel, that is, to rotate the shaft 9. To increase the speed of the shaft 9 the blades 23 are gradually extended until the shaft 9 is moving at the same speed as the fly wheel.

The valves 20 and 20$^a$ have axial stems 42, to which are secured arms 43. Each of these arms 43 is longitudinally slotted at its upper end and engages a pin 44 on a rod 45 which is movable transversely of the casing, and is connected to operating mechanism to be later described.

The rotor in the chamber 6 comprises a hub 22$^a$ which has radial recesses in which are arranged blades or vanes 46 corresponding to the blades or vanes 23 of the rotor in the fly wheel. These blades or vanes 46 have guides 47 at their ends, which move in radial openings in the hub, and each guide has an outwardly extending pin 48$^a$ at its inner end. These pins engage annular grooves in cam plates 49 mounted in the same manner as the cam plates 27 before mentioned, and the said plates are connected to an abutment 48 in the same manner as the plates 27 are connected to the abutment 28.

This abutment and the plates are moved toward and from the rotor, by means of a shaft 49$^a$ which is journaled in the casing 1, parallel with the shaft 9, and the said shaft is provided with radial arms 50, which have a lost motion connection with a stem 51 on the abutment. The shaft extends outwardly through the end of the casing and is provided with a worm wheel 52 at its outer end.

It will be evident that by oscillating the shaft the plates and the abutment may be operated.

The controlling mechanism for the transmission comprises a treadle indicated at 53, which is pivoted to the casing 1, as indicated at 54, near the lower end of the treadle, and a spring 55 is provided for normally holding the treadle in the position of Fig. 1. A link 56 connects the lower end of the treadle with the outer end of the lever 34, before mentioned, and by means of the treadle the lever 34 may be operated to control the blades 23 and the abutment 28. The treadle has an arm 57 rigid therewith and extending upwardly from the pivotal connection, and a link 58 connects the arm with a radial arm 59 on a worm 60 journaled on the head 2, the said worm meshing with the worm wheel 52 before mentioned. Thus when the treadle is moved to operate the lever 34, it will also operate the shaft 49ª. When the upper end of the treadle is moved forwardly, the abutment 28 is moved toward the rotor 22, and the blades 23 are withdrawn within the periphery of the hub 22. At the same time the abutment 48 has been moved away from the rotor in the chamber 6, and the blades 46 have been extruded, the parts occupy the relative position shown in Fig. 2. The engine is now started, and the fly wheel will rotate with respect to the driven shaft. As long as the projected blade area between the abutment 28 and the hub 22 of the rotor in the fly wheel 22 is zero, there will be no pumping action, and the parts will rotate idly with respect to each other. The operator now wishing to start the vehicle permits the spring 55 to return the treadle 53 to its original position, and the return movement of the treadle will extrude the blades 23 and withdraw the blades 46. This movement, however, will be slow, and as the blades 23 are extended, a pumping action will be set up, and the shaft 9 will begin to move with the fly wheel.

The liquid, oil, as a rule, in the chamber 7 is subjected to the atmospheric pressure through an opening 61 in a block 62 which is threaded into the cover 4′, and this atmospheric pressure will cause the oil to retain the chamber 8 filled at all times. The rotor in the fly wheel and connected parts, which will be hereafter designated as the clutch unit, will thus eventually clutch the driving shaft to the driven shaft, and the relative speed between the parts will depend upon the position of the treadle 53. This treadle might be held by the foot at the desired position, but mechanism is provided for holding the treadle automatically at the position desired.

The said mechanism, which is shown in detail in Fig. 8, comprises an auxiliary cylinder 62, having a port 63 communicating with the cylinder 1, and having a second port 64 communicating with the said cylinder and separated from the body of the cylinder by a partition 65. This partition has a valve seat, and a conical valve 66 coöperates with the seat to close communication between the cylinder and the port 64. The valve is normally held closed by a spring 67, and the stem 68 of the valve extends out through the end of the cylinder and is provided with a longitudinally extending slot 69. A piston 70 is mounted to reciprocate in the cylinder, and the stem 71 of the piston extends out through the opposite head and is connected with the upwardly extending arm 72 on the treadle, the connection being a lost motion connection, as shown.

The slot 69 of the stem 68 is engaged by the upper end of a lever 73 which is pivoted to the casing 1, and a spring 74 connected with the lever normally tends to hold the valve closed. A link 75 is connected with the lower end of the lever, and the opposite end of the link from the lever engages a cam 76 which is mounted upon a worm shaft 77 journaled within the mounting 78 of the steering wheel. The worm is engaged by a worm wheel 79 on a shaft 80 journaled in the said mounting, and extending above the steering wheel and having secured thereto an operating handle 81. The pitch of the worm and worm wheel is forty-five degrees or thereabout. It will be obvious that when the handle 81 is turned, the shaft 77 will be rotated, and the lever 73 will be operated to control the valve 66. When the treadle is moved forward, the piston 70 is moved therewith, and a charge of oil is drawn into the cylinder 62 past the valve 66. It will be obvious that the lever will be held in thrown position by the oil which has been drawn into the cylinder. In order to connect the driving and driven shafts at any desired speed, it is only necessary to permit the proper portion of oil to escape from the cylinder 62, and this is brought about by the cam 76 and the valve 66.

In Fig. 11 is shown the steering wheel and the handle 81. It will be noticed that a ring 82 is mounted above the wheel, the said ring bearing position indicators for the lever and the ring is secured to the support for the steering shaft. When the treadle is moved forwardly, the lever is moved to the position indication L which is the locking position, the parts being thus locked in inoperative position. When the operator wishes to start the vehicle and to gradually increase the speed, he will move the lever from the position indication L toward the position indication H, and with every movement of the lever a little of the oil is permitted to escape from the cylinder, and the treadle is permitted to move rearwardly under the influence of the spring 55. It will be understood that the valve 66 governs the speed of the rearward movement of the treadle. The greater the opening of the valve the quicker the treadle will move. When the lever reaches the position indication H the driving shaft and the driven shaft will be rotated together and the transmission will be in the high speed. When the operator wishes to reverse, the treadle is again moved to forward position, thus idling the transmission, and the lever 81 is moved to the position indication R, after which the operator will control the rearward movement of the treadle with his foot. The manual control of the rearward movement of the treadle is necessary, because the valve 66 is open and there is nothing to prevent the backward movement of the piston 70. Before reversing, however, the reversing valves 20 and 20ª are controlled by the lever 81 through the shaft 77. This shaft has a radial arm 83, which is connected by a link 84 with one of the arms of an elbow lever 85 pivoted on the casing 1, the other arm of the lever being connected to the rod 45 before-mentioned. When the lever 81 is moved to the position indication R, not only will the valve 66 be open but the link 84 will operate the elbow lever 85, and will move the valves 20—20ª to reversing position. The movement of the lever 81 to the position indication L, while it moves the valves 20—20ª does not move them sufficiently to interfere with the proper flow of the liquid between the chambers 6, 7, and 8, because the openings through the valves are made large enough to span their respective ports when the valve is at the position indication L.

The clutch, consisting of the rotor having the hub 22 and the fly wheel composed of the elements 10, 11, 12 and 29, which will be hereafter referred to as the clutch unit, when used in itself, will give all the speeds up to and including the direct drive, yet there is a large waste of power. The greater the difference in speed of rotation between the driving and driven shafts, the greater the waste, and the rotor having the hub 22ª and associated parts, which will be hereafter referred to as the booster unit, are provided to utilize this waste.

The clutch consists, as before stated, of the fly wheel, that is, the elements connected to and rotating with the shaft 13 and the rotor having the hub 22. It will be obvious that when the relative speed of the shaft 9 is but half that of the fly wheel or motor shaft, the actual power transmitted to the driven shaft is but one-half that developed by the motor or driving shaft, and the other half of the power is wasted in heat, that is, the motor is delivering to the driven shaft but one-half its energy. By providing the booster unit, this waste is utilized, for the booster unit blades move in the opposite direction to those of the clutch unit.

When the treadle is thrown into the forward position to disconnect the driving shaft from the driven shaft, the blades 46 are fully extended and the blades 23 fully contracted. With the first extension of the blades 23 a pumping action is set up, that is, the liquid is put into motion, and this motion acts upon the partially extended blades 46 of the booster unit. With the improved construction, when a certain amount of power is transmitted through the driving shaft 14 to the driven shaft 9, the remainder of the power developed by the motor, not needed, is passed into the booster unit, where it does useful work.

In coasting in the motor vehicle the driven shaft 9 will act as the driving shaft, because it will rotate while the motor shaft is stopped. It will be recalled that when the clutch unit is disconnected, that is, when the shaft 9 is disconnected from the shaft 14, the blades of the rotor having the hub 22ª are fully extended, and the shaft 9 being driven by the coasting of the vehicle, will cause the rotor having the hub 22ª to set up a pumping action which will act upon the blades 23 of the rotor having the hub 22, when the said blades are extended or partially extended, acting thus as an effectual brake, and this braking action may be varied according to the extent of protrusion of the blades.

It will be understood that the outer edges of the blades are always in contact with the adjacent faces of the abutments. When the blades are in the innermost position, the abutments contact with the peripheries of the hubs, and there is no movement of fluid because there is nothing to carry the fluid through the passage between the inlets and the outlets of the stator casing, that is, the fly wheel and the chamber 6. When, however, the abutment moves away from the periphery of the adjacent hub to make an opening between the abutment and the hub periphery, the blades are extended as they pass the abutment, still moving in contact therewith, and a pumping action is set up, the blades moving the liquid through the passage between the abutment and the rotor hub periphery.

I claim:

1. A transmission mechanism comprising in combination with the alined driving and driven shafts, a plurality of rotors on the driven shaft, each rotor having radially movable blades, a fly wheel inclosing the rotor near the driving shaft and connected to the said shaft, a casing inclosing the rotors and adapted to contain a liquid and having a chamber for each rotor and an intermediate chamber, and having an open port leading from the intermediate to the driving shaft rotor chamber, and having means for constraining the liquid to flow from the intermediate through the driving to the driven shaft chamber or from the intermediate through the driven shaft to the driving shaft chamber, an abutment adjacent to each rotor and coöperating with the blades thereof, means in connection with each abutment for contracting the blades when the abutment is moved toward the rotor and for extending the blades when the abutment is moved away from the rotor, and controlling means for simultaneously moving one abutment toward the rotor and the other abutment away from the rotor, fluid pressure operated means for holding the controlling means with the driving shaft rotor in inoperative position, a spring for moving the said controlling means in the opposite direction, and manually controlled means for actuating the fluid pressure operated means to release the controlling means.

2. A transmission mechanism comprising in combination with the alined driving and driven shafts, a plurality of fluid controlled rotors on the driven shaft, a fly wheel inclosing the rotor near the driving shaft and connected to the said shaft, a casing inclosing the rotors and adapted to contain a liquid and having a chamber for each rotor and an intermediate chamber, and having an open port leading from the intermediate to the driving shaft rotor chamber, and having means for causing the liquid to flow from the intermediate through the driving shaft and the driven shaft chambers or in the reverse direction, when the rotors are in operation, said rotors being movable into and out of operative position, means for controlling the rotors for alternately moving them into operative position, fluid pressure operated means for holding the controlling means with the driving shaft rotor in inoperative position, normally active means for moving the said controlling means in the opposite direction, manually controlled means for actuating the fluid pressure operated means to release the controlling means, and means in connection with the manually controlled means and operated by the movement thereof for controlling the reversing means for the flow of the liquid.

3. A transmission mechanism comprising in combination with the alined driving and driven shafts, a plurality of fluid controlled rotors on the driven shaft, a fly wheel inclosing the rotor near the driving shaft and connected to the said shaft, a casing inclosing the rotors and adapted to contain a liquid and having a chamber for each rotor and an intermediate chamber, and having an open port leading from the intermediate to the driving shaft rotor chamber, and having means for causing the liquid to flow from the intermediate through the driving shaft and the driven shaft chambers or in the reverse direction, when the rotors are in operation, said rotors being movable into and out of operative position, means for controlling the rotors for alternately moving them into operative position, fluid pressure operated means for holding the controlling means with the driving shaft rotor in inoperative position, normally active means for moving the said controlling means in the opposite direction, and manually controlled means for actuating the fluid pressure operated means to release the controlling means.

4. A transmission mechanism comprising in combination with the alined driving and driven shafts, a plurality of fluid controlled rotors on the driven shaft, a fly wheel inclosing the rotor near the driving shaft and connected to the said shaft, a casing inclosing the rotors and adapted to contain a liquid and having a chamber for each rotor and an intermediate chamber, and having an open port leading from the intermediate to the driving shaft rotor chamber, and having means for causing the liquid to flow from the intermediate through the driving shaft and the driven shaft chambers or in the reverse direction, when the rotors are in operation, said rotors being movable into and out of operative position, and means for controlling the rotors for alternately moving them into operative position.

5. A transmission mechanism comprising in combination with the driving and driven shafts, a plurality of fluid controlled clutches, one of the said clutches being a booster clutch and being secured to the driven shaft and the other being arranged between the driving and the driven shafts for connecting the said shafts, means for alternately operating the said clutches, fluid pressure operated means for holding the controlling means with the connecting clutch in inoperative position and with the booster clutch in operative position, normally active means for moving the controlling means in the opposite direction, manually controlled means for actuating the fluid pressure operated means to release the controlling means, and reversing means for the transmission controlled by the release of the fluid pressure operated means.

6. A transmission mechanism comprising in combination with the driving and driven shafts, a plurality of fluid controlled clutches, one of the said clutches being a booster clutch and being secured to the driven shaft and the other being arranged between the driving and the driven shafts for connecting the said shafts, and means for alternately operating the said clutches.

7. A transmission mechanism comprising in combination with the driving and driven shafts, a plurality of fluid controlled clutches, one of the said clutches being a booster clutch and being secured to the driven shaft and the other being arranged between the driving and the driven shafts for connecting the said shafts, means for alternately operating the said clutches, fluid controlled means for holding the operating means with the connecting clutch in inoperative position, means normally acting to move the operating means against the resistance of the fluid controlled means, and means for releasing the fluid controlled means to permit the operating means to assume any desired position.

ELWYN METTE RAYBURN.
ALDEN GRANVILLE RAYBURN.